(12) United States Patent
Mahajan et al.

(10) Patent No.: US 10,192,270 B1
(45) Date of Patent: Jan. 29, 2019

(54) OPTIMIZING INVESTMENTS TO ACHIEVE A SALES GOAL

(71) Applicant: Accenture Global Services Limited, Dublin (IE)

(72) Inventors: Rahul Mahajan, New Delhi (IN); Conor McGovern, London (GB); Paul Leyderman, Vernon Hills, IL (US)

(73) Assignee: Accenture Global Services Limited, Dublin (IE)

( * ) Notice: Subject to any disclaimer, the term of this patent is extended or adjusted under 35 U.S.C. 154(b) by 1014 days.

(21) Appl. No.: 14/468,865

(22) Filed: Aug. 26, 2014

(51) Int. Cl.
  *G06Q 40/06* (2012.01)
  *G06Q 30/02* (2012.01)

(52) U.S. Cl.
  CPC ......... *G06Q 40/06* (2013.01); *G06Q 30/0241* (2013.01)

(58) Field of Classification Search
  CPC . G06Q 40/06; G06Q 30/0241; G06Q 30/0276
  See application file for complete search history.

(56) References Cited

U.S. PATENT DOCUMENTS

| | | | | |
|---|---|---|---|---|
| 7,729,940 B2* | 6/2010 | Harvey | ............. | G06Q 10/0639 705/14.41 |
| 8,027,897 B2* | 9/2011 | Lakshminarayan | ... | G06Q 40/00 705/35 |
| 8,645,177 B2* | 2/2014 | Pachon | ................. | G06Q 10/04 705/7.12 |
| 2007/0106550 A1* | 5/2007 | Umblijs | ............. | G06Q 10/0631 705/7.12 |
| 2011/0282731 A1* | 11/2011 | Guglielmi | ............. | G06Q 30/02 705/14.43 |

(Continued)

FOREIGN PATENT DOCUMENTS

| | | | | |
|---|---|---|---|---|
| CA | 2825159 | * | 8/2013 | ............. G06Q 30/02 |
| WO | WO 01/278844 | * | 4/2001 | ............. G06F 17/60 |

OTHER PUBLICATIONS

Green et al: Chapter 16: Optimization in Several Variables with Constraints, 2011, pp. 465-496.*

(Continued)

*Primary Examiner* — Bijendra K Shrestha
(74) *Attorney, Agent, or Firm* — Harrity & Harrity, LLP

(57) ABSTRACT

A device may configured to receive a request to provide optimized investment information. The optimized investment information may indicate optimized investments for types of marketing. The device may receive constraint information indicating bounds for the optimized investments. The device may receive sales goal information indicating a sales goal to be achieved by the optimized investments. The device may determine the sales goal is not achievable based on the bounds. The device may broaden the bounds for the optimized investments based on the sales goal not being achievable such that the optimized investments may deviate from the bounds. The device may determine the optimized investments based on a deviation of the optimized investments from the bounds and a total investment cost of the optimized investments to achieve the sales goal. The device may provide the optimized investment information, indicating the optimized investments, to another device based on the request.

20 Claims, 8 Drawing Sheets

(56) References Cited

U.S. PATENT DOCUMENTS

| | | | |
|---|---|---|---|
| 2012/0296703 A1* | 11/2012 | Davis | G06Q 10/04 |
| | | | 705/7.35 |
| 2014/0101685 A1* | 4/2014 | Kitts | H04N 21/44213 |
| | | | 725/14 |
| 2014/0188631 A1* | 7/2014 | Grigg | G06Q 30/0275 |
| | | | 705/14.71 |
| 2015/0066662 A1* | 3/2015 | Knapp | G06Q 30/0275 |
| | | | 705/14.71 |
| 2016/0055497 A1* | 2/2016 | Anneroth | G06Q 30/0203 |
| | | | 705/7.32 |
| 2017/0043180 A1* | 2/2017 | Amthor | A61N 5/1027 |

OTHER PUBLICATIONS

Green et al.: Chapter 16: Optimization in Several Variables with Constraints, 2011, pp. 465-496 (Year: 2011).*

Zgajnaretal.: Weighted goal programming and penalty functions: whole-farm planning approach under risk,, 2011, paper prepared and presentation at EAAE 2011 congress Change and Uncertianity, Challenges for Agriculture, Food and Natural Resources, Eth Zurich, Zurich, Switzerland, pp. 1-13 (Year: 2011).*

Brodie etal.: Sparse and stable Markowitz portfolio, May 28, 2008, pp. 1-17. (Year: 2008).*

Wikipedia, "Marketing performance measurement and management", hrrp://en.wikipedia.org/wiki/Marketing_performance_measurement_and_management, May 6, 20147, 7 pages.

* cited by examiner

US 10,192,270 B1

OPTIMIZING INVESTMENTS TO ACHIEVE A SALES GOAL

BACKGROUND

A company may rely on marketing to sell a product. For example, the company may use different kinds of advertisements to promote the product. The company may have to decide what kinds of advertisements to use to promote the product and how much money to invest in each kind of advertisement.

SUMMARY

In some implementations, a device may receive a request to provide optimized investment information. The optimized investment information may indicate optimized investments for a plurality of types of marketing. The device may receive constraint information indicating bounds for the optimized investments. The device may receive sales goal information indicating a sales goal to be achieved by the optimized investments. The device may determine the sales goal is not achievable based on the bounds. The device may broaden the bounds for the optimized investments based on the sales goal not being achievable such that the optimized investments may deviate from the bounds. The device may determine the optimized investments based on a deviation of the optimized investments from the bounds and a total investment cost of the optimized investments to achieve the sales goal. The device may provide the optimized investment information, indicating the optimized investments, to another device based on the request.

In some implementations, a computer-readable medium may store one or more instructions that, when executed by a processor, cause the processor to receive a request to provide optimized investment information. The optimized investment information may indicate optimized investments for a plurality of types of marketing used to sell a product. The instructions may cause the processor to receive constraint information indicating bounds for the optimized investments and an aggregate constraint. The aggregate constraint may indicate aggregate bounds for a combined investment for more than one of the plurality of types of marketing. The instructions may cause the processor to receive sales goal information indicating a sales goal for the product to be achieved by the optimized investments. The instructions may cause the processor to determine the sales goal is not achievable based on at least one of the bounds or the aggregate bounds. The instructions may cause the processor to relax the bounds and the aggregate bounds based on the sales goal not being achievable. The instructions may cause the processor to determine the optimized investments based on a first deviation of the optimized investments from the bounds, a second deviation of the combined investment from the aggregate bounds, and a total investment cost of the optimized investments to achieve the sales goal. The instructions may cause the processor to provide the optimized investment information, indicating the optimized investments, based on the request.

In some implementations, a method may include receiving, by a device, a request to provide optimized investment information. The optimized investment information may indicate optimized investments for a plurality of types of marketing. The method may include receiving, by the device, constraint information indicating a minimum bound and a maximum bound for the optimized investments. The method may include receiving, by the device, sales goal information indicating a sales goal to be achieved by the optimized investments. The method may include determining, by the device, the sales goal is not achievable within the minimum bound and the maximum bound. The method may include decreasing the minimum bound and increasing the maximum bound for the optimized investments, by the device, based on the sales goal not being achievable such that the optimized investments may deviate from at least one of the minimum bound and the maximum bound. The method may include determining, by the device, the optimized investments based on a deviation of the optimized investments from at least one of the maximum bound or the minimum bound and a total investment cost of the optimized investments to achieve the sales goal. The method may include providing, by the device, the optimized investment information, indicating the optimized investments, based on the request.

DETAILED DESCRIPTION

The following detailed description of example implementations refers to the accompanying drawings. The same reference numbers in different drawings may identify the same or similar elements.

Marketing analytics may be used to determine an optimal mix of investments to achieve a sales goal of a product at a minimum total cost of investment. For example, marketing analytics may rely on investment patterns, marketing budgets, historical effectiveness of advertisements, product categories, and the like to determine the optimal mix of investments for marketing a particular product. Accordingly, information identifying the optimal mix of investments may be provided to a user (e.g., a chief marketing officer of a company).

The user may tailor the optimal mix of investments by specifying marketing constraints that must be satisfied by the optimal mix of investments. For example, only a particular amount of deviation from historical or current marketing budgets may be permitted by the user in the optimal mix of investments. However, these constraints, along with the marketing budget, may make the sales goal unrealistic. In other words, the marketing analytics may indicate that a sales goal is not achievable given particular marketing budgets and constraints.

Accordingly, rather than simply informing the user that a sales goal is not achievable, implementations described herein may relax the constraints to determine if the sales goal is achievable within relaxed constraints. If the sales goal is achievable within the relaxed constraints, implementations described herein may determine an optimal mix of investments that will meet the sales goal, while striking a balance between minimizing the total investments and minimizing a deviation from the constraints.

Figure 1:
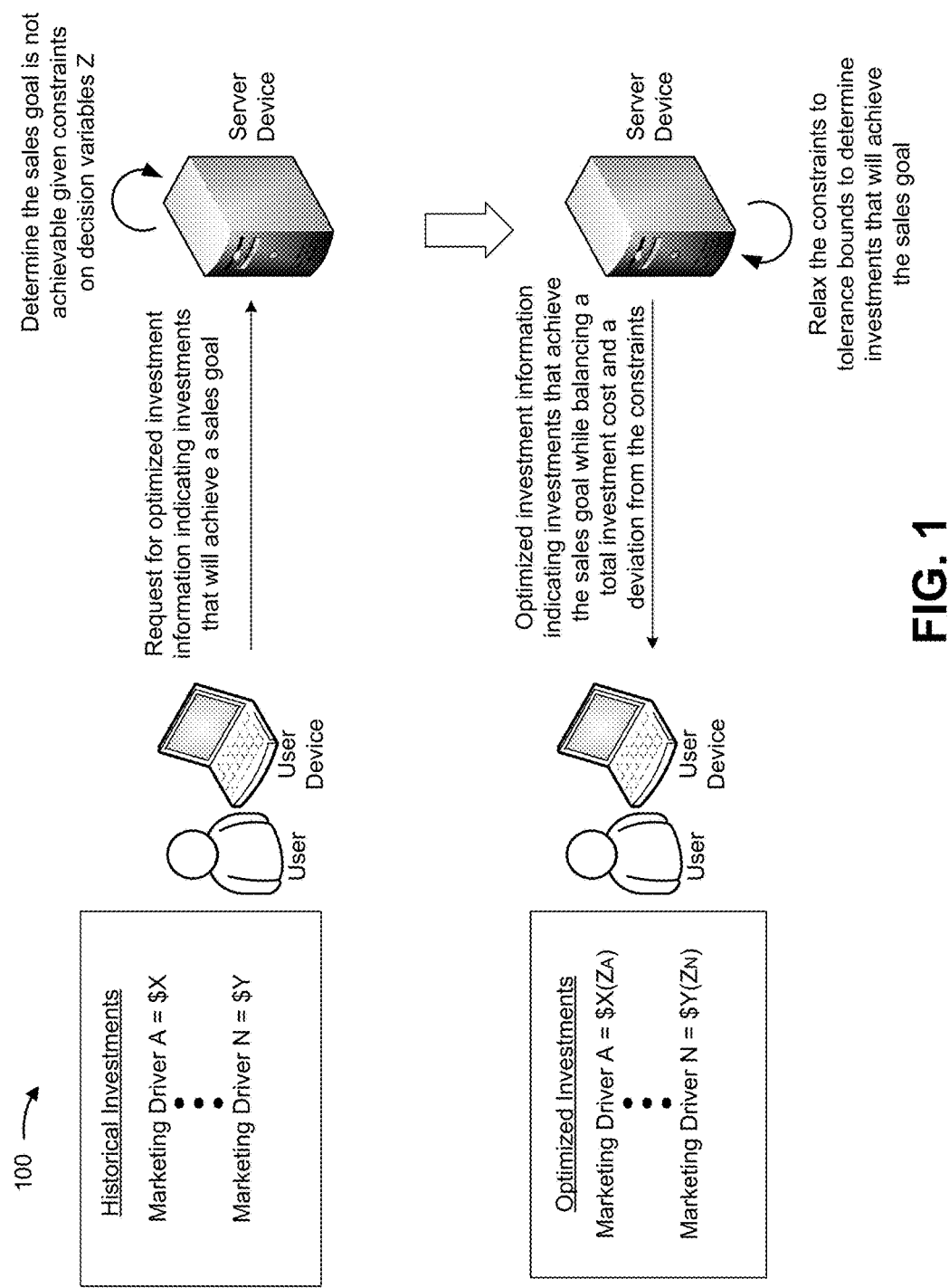
FIG. 1 is a diagram of an overview of an example implementation described herein.

FIG. 1 is a diagram of an overview of an example implementation 100 described herein. In FIG. 1, assume a user is tasked with selling a product. Further, assume the user has historically invested in particular marketing drivers (e.g., marketing investments A-N) to sell the product. For example, a marketing driver may include a type of advertisement (e.g., Internet advertisements, TV advertisements, print advertisements, etc.), a type of sales channel, etc.

Assume the user inputs a request for optimized investment information into a user device. The request may include historical investment information indicating the marketing drivers that the user uses and/or a historical investment for each marketing driver. For example, as shown in FIG. 1, the user may historically invest $X in marketing driver A, and may historically invest $Y in marketing driver N. The request may further specify constraints on decision variables Z used to optimize the investments. A decision variable Z may indicate a ratio of an optimized investment for a marketing driver compared to the historical investment. Therefore, an optimized investment may be equal to the decision variable Z multiplied by the historical investment. The constraints may indicate a range by which an optimally determined investment is permitted to deviate from the historical investment. In other words, the constraints may define initial bounds for the decision variables Z. Furthermore, the request may indicate a sales goal for the product that is to be achieved by the optimized investments for the marketing drivers. Accordingly, the request may request optimized investment information that indicates optimized investments for the marketing drivers that will achieve the sales goal, minimize a total investment, and satisfy the constraints.

The user device may send the request to a server device and the server device may receive the request. The server device may use marketing analytics to predict or estimate sales based on the request and/or other factors (e.g., current market factors). As shown in FIG. 1, assume that the server device determines the sales goal is not achievable given the constraints on the decision variables Z. In other words, the server device may determine the sales goal is not realistic given the constraints on the decision variables Z.

Rather than simply informing the user that the sales goal is not achievable, the server device may relax the constraints to particular tolerance bounds that are wider than the initial constraints. Accordingly, the server device may determine that the sales goal is achievable within the tolerance bounds. The server device may determine optimized values for the decision variables (e.g., the deviation from the historical investments) that not only achieve the sales goal, but that also strike a balance between a total investment cost and a deviation from the initial constraints. In some implementations, the balance may be determined based on user input. In other words, the user may indicate which is more optimal, a minimized total investment cost or a minimized deviation from the initial constraints.

The server device may determine the optimized investments for each marketing driver and provide optimized investment information indicating the optimized investments to the user device. The user device may then present the optimized investment information to the user. For example, the optimized investment information may indicate that an investment of $X*$Z_A$ in marketing driver A and an investment of $Y*$Z_N$ in marketing driver N will achieve the sales goal, while striking a balance between minimizing a total investment and minimizing a deviation from the initial constrains. Here, decision variable $Z_A$ may indicate a ratio or a percentage difference between the optimized investment and the historical investment (e.g., $X) for marketing driver A. Likewise, decision variable $Z_N$ may indicate a ratio or a percentage difference between the optimized investment and the historical investment (e.g., $Y) for marketing driver N.

In this way, the server device may provide the user with information identifying optimized investments to achieve a sales goal even if the sales goal is not achievable given the initial constraints set by the user. Moreover, the optimized investments may represent a balance between minimizing a total investment cost and minimizing a deviation from the initial constraints, such that the optimized investments represent a balance set by the user.

Figure 2:
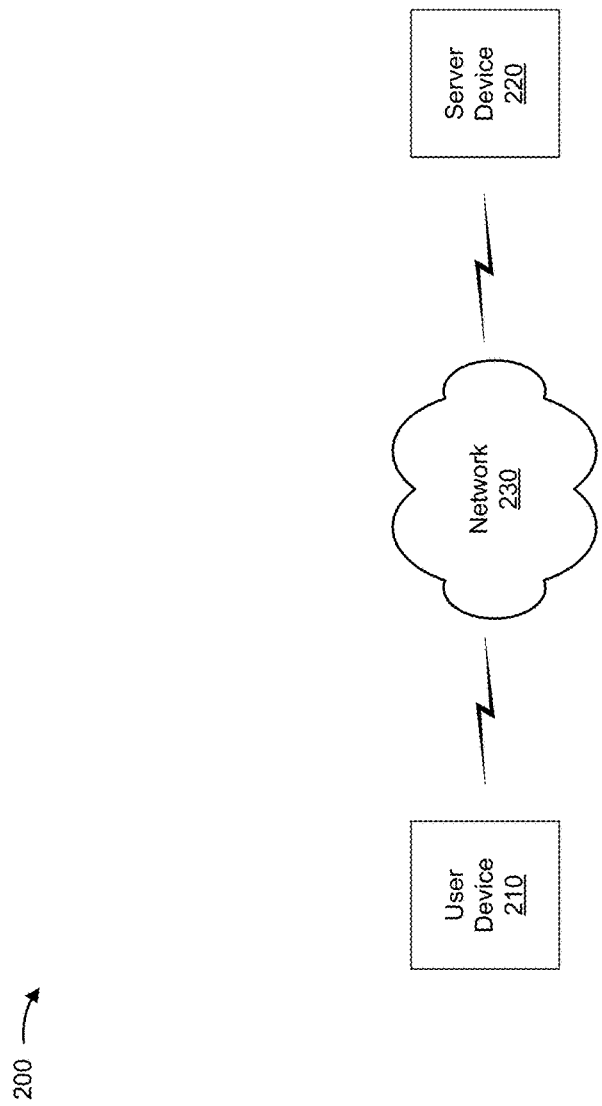
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and/or a network 230. Devices of environment 200 may interconnect via wired connections, wireless connections, or a combination of wired and wireless connections.

User device 210 may include a device capable of receiving, generating, storing, processing, and/or providing information. For example, user device 210 may include a communications and/or computing device, such as a mobile phone (e.g., a smart phone, a radiotelephone, etc.), a laptop computer, a tablet computer, a desktop computer, a handheld computer, or a similar device. In some implementations, user device 210 may receive information from and/or transmit information to another device in environment 200. In some implementations, user device 210 may request information indicating how to optimize investments.

Server device 220 may include one or more devices capable of storing, processing, and/or routing information. In some implementations, server device 220 may include a communication interface that allows server device 220 to receive information from and/or transmit information to other devices in environment 200. In some implementations, server device 220 may determine how to optimize investments.

Network 230 may include one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
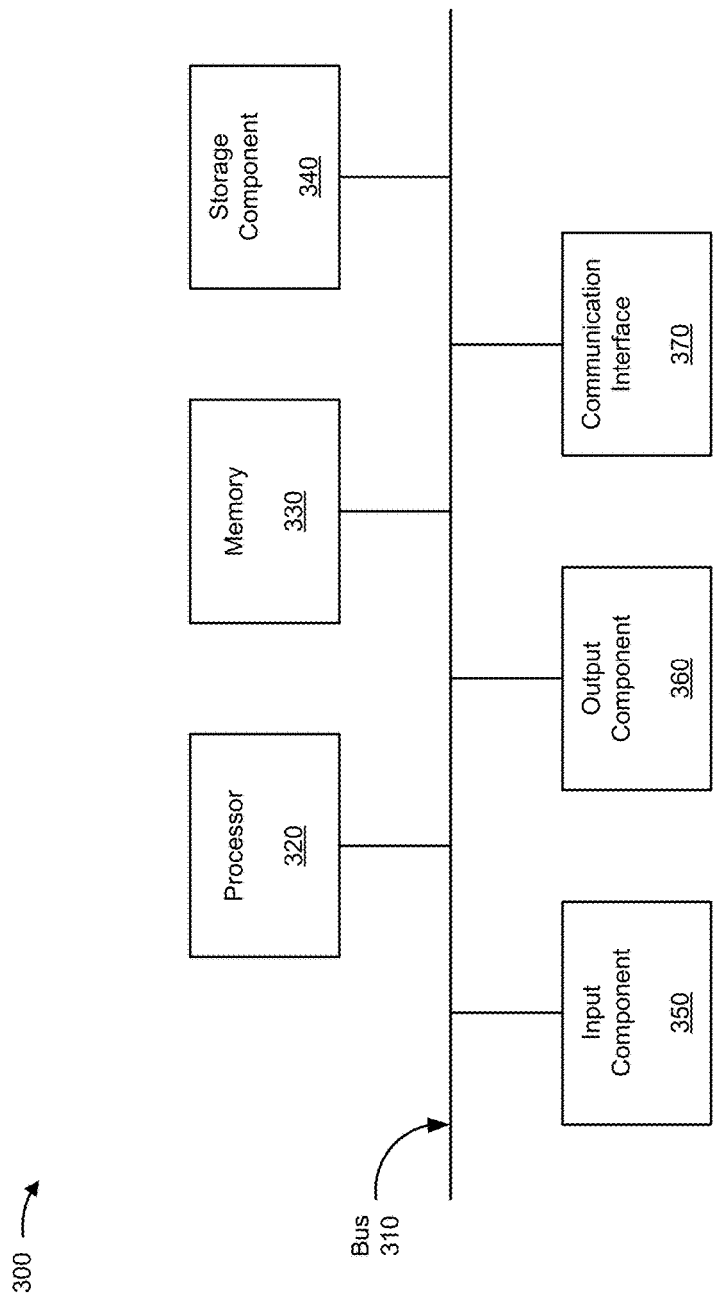
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
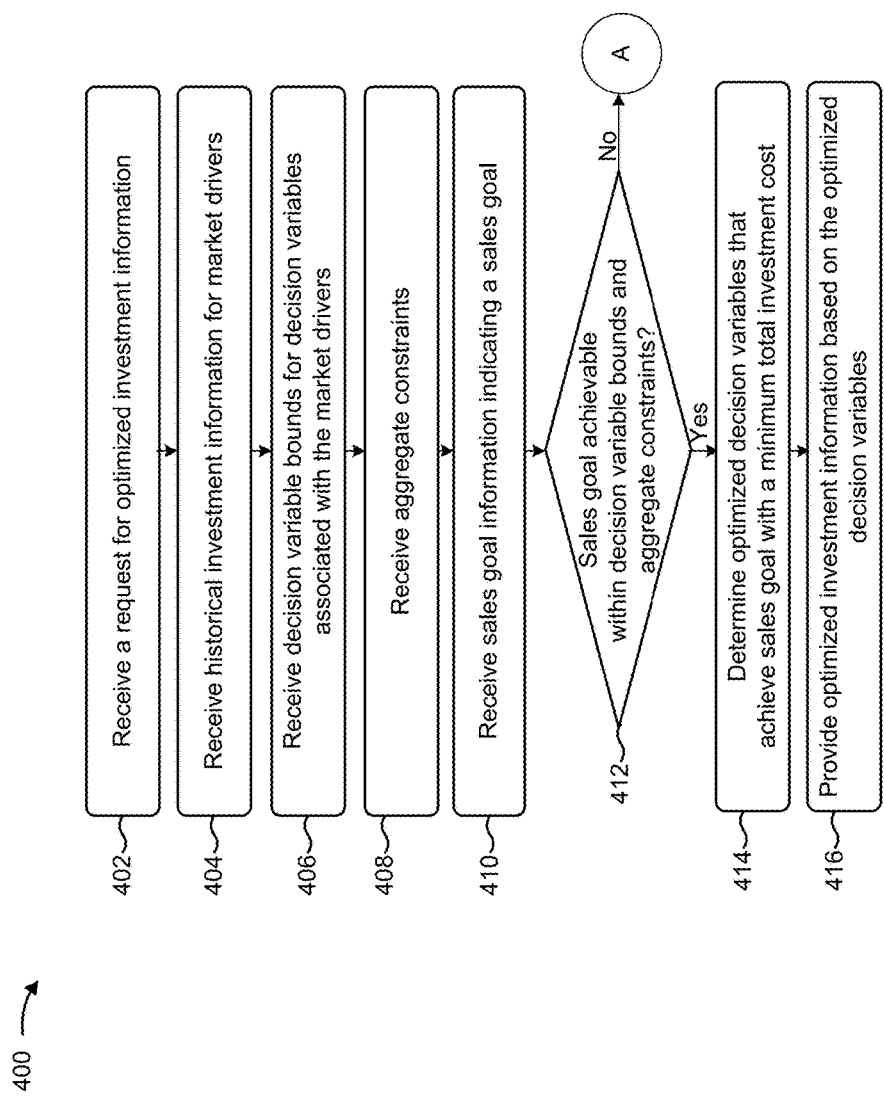
FIGS. 4A and 4B are flow charts of an example process for determining optimized investment information.
Figure 4B:
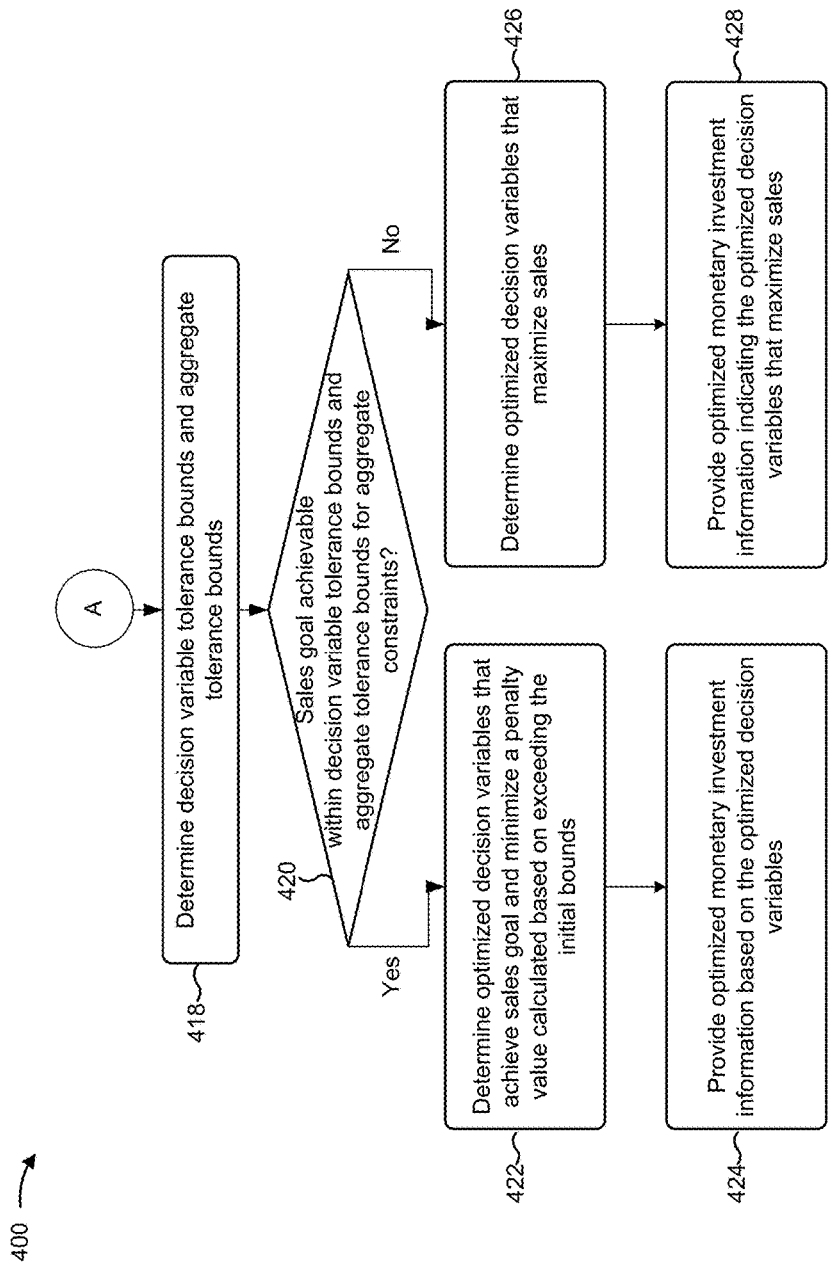

FIGS. 4A and 4B are flow charts of an example process 400 for determining optimized investment information. In some implementations, one or more process blocks of FIGS. 4A and 4B may be performed by server device 220. In some implementations, one or more process blocks of FIGS. 4A and 4B may be performed by another device or a group of devices separate from or including server device 220, such as user device 210.

As shown in FIG. 4A, process 400 may include receiving a request for optimized investment information (block 402). For example, server device 220 may receive the request for optimized investment information from user device 210.

A user of user device 210 may input the request into user device 210. User device 210 may send the request to server device 220 and server device 220 may receive the request. The request may request optimized investment information that indicates optimized investments for selling a particular amount of product (e.g., a sales goal) in a particular amount of time (e.g., an optimization time period).

As further shown in FIG. 4A, process 400 may include receiving historical investment information for market drivers (block 404). For example, server device 220 may include receiving the historical investment information from user device 210.

A market driver may include a type of investment that a user uses to sell a product. For example, a market driver may include a type of advertising, a type of promotion, or another method of marketing a product. Furthermore, the market driver may indicate a region targeted by the market driver. For instance, a market driver may include investments in national online search advertisements, national print advertisements, city based radio advertisements, regionally based billboards, national TV advertisements, or the like.

The historical investment information may indicate a historical investment for each of the market drivers. The historical investment may include time series data, a total historical monetary investment for a particular market driver, an average historical monetary investment for the particular market driver per a certain amount of time, a median historical monetary investment of the particular market driver per a certain amount of time, or the like.

A historical investment for a particular market driver i may be denoted as $M_i$. An optimized investment over an optimization time period (e.g., a time in which to achieve a sales goal) for the particular market driver may be denoted as $X_i$. A decision variable $Z_i$ may represent a relative increase ($Z_i>1$) or decrease ($Z_i<1$) of the optimized investment $X_i$ compared to the historical investment $M_i$ for the particular market driver. In other words, the optimized investment $X_i$ may equal the product of the decision variable $Z_i$ and the historical investment $M_i$ as expressed in formula 1 below:

$$X_i = Z_i M_i \qquad \text{Formula 1:}$$

In some implementations, a user of user device 210 may input the historical investment information into user device 210. User device 210 may send the historical investment information to server device 220 and server device 220 may receive the historical investment information. Additionally, or alternatively, server device 220 may receive the historical investment information from another device.

As further shown in FIG. 4A, process 400 may include receiving decision variable bounds for the decision variables associated with the market drivers (block 406). For example, server device 220 may receive the decision variable bounds from user device 210.

The decision variable bounds for the decision variables may indicate an allowable range of the decision variables $Z_i$ for optimization. The decision variable bounds may include a lower decision variable bound ($lb_i$) and an upper decision variable bound ($ub_i$). In other words, the decision variable bounds may indicate a maximum and a minimum permitted ratio of the optimized investment to the historical investment for a particular market driver as expressed in formula 2 below:

$$lb_i \leq Z_i \leq ub_i \quad \text{Formula 2:}$$

In some implementations, decision variable bounds may be set for each market driver individually. Alternatively, decision variable bounds may be set that apply to all or some set of market drivers.

In some implementations, a user of user device 210 may input the decision variable bounds into user device 210. User device 210 may send the decision variable bounds to server device 220 and server device 220 may receive the decision variable bounds. Server device 220 may set the decision variable bounds based on the user input. In this way, the user may specify a range that the user is willing to deviate from historical investment norms to achieve the sales goal.

Additionally, or alternatively, server device 220 may use default values for the decision variable bounds. In some implementations, server device 220 may permit the user to modify the default values for the decision variable bounds.

As further shown in FIG. 4A, process 400 may include receiving aggregate constraints (block 408). For example, server device 220 may receive the aggregate constraints from user device 210.

An aggregate constraint may represent an aggregate or combined investment that depends on multiple marketing drivers. For example, an aggregate constraint may indicate a combined investment of particular market drivers together with allowable aggregate bounds for the combined investment.

A particular aggregate constraint k may be expressed by formula 3 below:

$$lba_k \leq g_k(Z) \leq uba_k;$$

where $lba_k$ represents a lower aggregate bound, $g_k(Z)$ represents a linear combination of multiple decision variables, and $uba_k$ represents an upper aggregate bound.

In some implementations, each decision variable $Z_i$ included in the linear combination of decision variables $g_k(Z)$ may be weighted. For example, consider an aggregate constraint that includes a combination of decision variables $Z_1, Z_2, Z_3$, and $Z_4$ for respective market drivers, each having a respective weight a, b, c, and d. In some implementations, the respective weights may add up to one (e.g., a+b+c+d=1). Alternatively, the respective weights may not add up to one. Accordingly, an aggregate constraint may take the form expressed by formula 3A below:

$$lba_k \leq aZ_1 + bZ_2 + cZ_3 + dZ_4 \leq uba_k; \text{ where } g_k(Z) = aZ_1 + bZ_2 + cZ_3 + +dZ_4 \quad \text{Formula 3A:}$$

In some implementations, a user of user device 210 may input one or more aggregate constraints into user device 210. For example, the user may input an aggregate constraint by specifying the aggregate bounds (e.g., the lower aggregate bound $lba_k$ and the upper aggregate bound $uba_k$), the market drivers associated with the decision variables $Z_i$ to be included in the linear combination, and weights for each of the decision variables $Z_i$ associated with the market drivers. User device 210 may send the aggregate constraint(s) to server device 220 and server device 220 may receive the aggregate constraint(s). Server device 220 may set the aggregate constraint(s) based on the user input. In this way, the user may specify constraints on a group of market drivers to be satisfied to achieve the sales goal.

As further shown in FIG. 4A, process 400 may include receiving sales goal information indicating a sales goal (block 410). For example, server device 220 may receive the sales goal information from user device 210.

The sales goal information may indicate a sales goal G that the user specifies. The sales goal G may indicate a quantity of products sold during an optimization time period, a total income during an optimization time period, a percent change in sales during after optimization time period, or another type of sales goal.

In some implementations, a user of user device 210 may input the sales goal information into user device 210. User device 210 may send the sales goal information to server device 220 and server device 220 may receive the sales goal information. Server device 220 may set the sales goal based on the user input and/or a previous sales goal input by the user.

As further shown in FIG. 4A, process 400 may include determining whether the sales goal G is achievable within the decision variable bounds and the aggregate constraints (block 412). For example, server device 220 may determine whether the sales goal G is achievable. Put differently, server device 220 may determine whether the sales goal G is realistic given the decision variable bounds and the aggregate constraints specified by the user.

Server device 220 may determine total possible sales based on the decision variables associated with the market drivers, the historical investment information, weekly historical monetary investment information, historical costs of marketing drivers, dimension levels (e.g., geographical locations, product types, etc.), localization factors (used to determine the values of national marketing drivers at each dimension level), marketing data (e.g., historical weekly distribution of marketing efforts for each market driver, sales-to-revenue multipliers, etc.), and/or parameter estimates (e.g., regression coefficients that represent estimates for the effectiveness of marketing drivers, an advertising adstock rate, a lag of the advertising, and/or any parameter for appropriate mathematical transformation of decision variables). The total possible sales may be represented by the function $f(Z_1, \ldots Z_n)$ for n number of decision variables $Z_i$.

In some implementations, server device 220 may determine whether the sales goal G is achievable within the decision variable bounds and the aggregate constraints by determining whether there are possible values for the decision variables $Z_i$, which are within the decision variable bounds and that satisfy the aggregate constraints, that will result in total possible sales being equal to (or greater than) the sales goal G. If values for the decision variables $Z_i$ exist that will result in the total possible sales being equal to (or greater than) the sales goal G, then server device 220 may determine the sales goal G is achievable. On the other hand, if values for the decision variables $Z_i$ do not exist that will result in the total possible sales being equal to (or greater than) the sales goal G, then server device 220 may determine the sales goal G is not achievable.

For example, server device 220 may determine whether the sales goal G is achievable based on whether formula 4 can be satisfied.

$$f(Z_1, \ldots, Z_n) = G;$$

$$lb_i \leq Z_i \leq ub_i \text{ for all } i;$$

$$lba_k \leq g_k(Z) \leq uba_k \text{ for all } k. \quad \text{Formula 4:}$$

Accordingly, if formula 4 can be satisfied, server device 220 may determine the sales goal G is achievable. On the other hand, if formula 4 cannot be satisfied, server device 220 may determine the sales goal G is not achievable.

As further shown in FIG. 4A, if the sales goal G is determined to be achievable within the decision variable bounds and the aggregate constraints (block 412—yes), process 400 may include determining optimized decision variables $Z_i$ that achieve the sales goal G with a minimum total investment cost (block 414). For example, server device 220 may determine optimized decision variables $Z_i$, which are within the decision variable bounds and that satisfy the aggregate constraints, which achieve the sales goal G with the minimum total investment cost.

An investment cost for a marketing driver may be determined based on the decision variable and the historical investment for the marketing driver (e.g., investment cost=$Z_i M_i$). The total investment cost may be determined based on summing the investment cost for each marketing driver (e.g.,).

$$\text{total investment cost} = \sum_{i=1}^{n} (Z_i M_i)$$

Accordingly, server device 220 may determine optimized decision variables $Z_1$ to $Z_n$ by determining decision variables $Z_1$ to $Z_n$ that satisfy formula 5:

Minimize $$\sum_{i=1}^{n} (Z_i M_i);$$

subject to $$f(Z_1, \ldots, Z_n) = G;$$

$$lb_i \leq Z_i \leq ub_i \text{ for all } i;$$

$$lba_k \leq g_k(Z) \leq uba_k \text{ for all } k. \quad \text{Formula 5:}$$

As further shown in FIG. 4A, process 400 may include providing optimized investment information based on the optimized decision variables $Z_i$ (block 416). For example, server device 220 may provide the optimized investment information to user device 210. User device 210 may receive the optimized investment information and present the optimized investment information to the user.

In some implementations, the optimized investment information may indicate the optimized decision variable $Z_i$ for each marketing driver. In this way, the user may be made aware of a percentage difference and/or a ratio between an optimized investment $X_i$ and a historical investment $M_i$ for a marketing driver.

In some implementations, server device 220 may determine the optimized investment $X_i$ for each marketing driver based on the optimized decision variable $Z_i$ and formula 1 (i.e., $X_i = Z_i M_i$). Accordingly, the optimized investment information may indicate the optimized investment $X_i$ for each marketing driver. In this way, the user may made aware of an amount of money to invest in each marketing driver (e.g., an amount to spend on particular types of advertising) to achieve the sales goal at the minimum total investment cost. Additionally, or alternatively, the optimized investment information may indicate the minimum total investment cost to achieve the sales goal G.

As further shown in FIG. 4A, if the sales goal is determined not to be achievable within the decision variable bounds and the aggregate constraints (block 412—no), process 400 may include determining decision variable tolerance bounds and aggregate tolerance bounds (block 418) (FIG. 4B). For example, server device 220 may determine decision variable tolerance bounds for the decision variables and aggregate tolerance bounds for the aggregate constraints.

In some implementations, the user of user device 210 may input a maximum tolerance value $t_{max}$ into user device 210. The maximum tolerance value $t_{max}$ may indicate a percentage to potentially change the decision variable bounds and the aggregate bounds when the sales goal is not achievable within the decision variable bounds and the aggregate bounds of the aggregate constraints. User device 210 may send the maximum tolerance value $t_{max}$ to server device 220 and server device 220 may receive the maximum tolerance value $t_{max}$. Alternatively, the maximum tolerance value $t_{max}$ may be a default value set by server device 220.

Server device 220 may determine an upper decision variable tolerance bound $t\_ub_i$ by increasing the upper decision variable bound $ub_i$ based on the maximum tolerance value $t_{max}$. Server device 220 may determine a lower decision variable tolerance bound $t\_lb_i$ by decreasing the lower decision variable bound $lb_i$ based on the maximum tolerance value $t_{max}$. Server device 220 may determine an upper aggregate tolerance bound $t\_uba_k$ by increasing the upper aggregate bound $t\_uba_k$ based on the maximum tolerance value $t_{max}$. Server device 220 may determine a lower aggregate tolerance bound $t\_lba_k$ by decreasing the lower aggregate bound $lba_k$ based on the maximum tolerance bound $t_{max}$.

For example, server device 220 may calculate the decision variable tolerance bounds and the aggregate tolerance bounds using formula 6.

$$t\_ub_i = ub_i + t_{max}; \quad t\_lb_i = lb_i - t_{max};$$

$$t\_uba_k = uba_k + t_{max}; \quad t\_lba_k = lba_k - t_{max}; \quad \text{Formula 6:}$$

where the decision variable bounds ($ub_i$, $lb_i$) and the aggregate bounds ($uba_k$, $lba_k$) are expressed as ratios with respect to baseline values.

Accordingly, the decision variable tolerance bounds and the aggregate tolerance bounds may represent wider bounds than the decision variable bounds and the aggregate bounds that were originally provided to achieve the sales goal.

As further shown in FIG. 4B, process 400 may include determining whether the sales goal G is achievable within the decision variable tolerance bounds and the aggregate tolerance bounds for the aggregate constraints (block 420). For example, server device 220 may determine whether the sales goal G is achievable. Put differently, server device 220 may determine whether the sales goal G is realistic given the decision variable tolerance bounds and the aggregate tolerance bounds.

As previously discussed, server device 220 may determine total possible sales based on the decision variables associated with the market drivers, the historical investment information, marketing data (e.g., historical weekly distribution of marketing efforts for each market driver, sales-to-revenue multipliers, etc.), and/or parameter estimates (e.g., regression coefficients that represent estimates for the effectiveness of marketing drivers, advertising adstock that represents a prolonged or lagged effect of advertising, power and lag parameters that represent appropriate variable transformations, etc.). The total possible sales may be represented by the function $f(Z_1, \ldots Z_n)$ for n number of decision variables $Z_i$.

In some implementations, server device 220 may determine whether the sales goal G is achievable within the decision variable tolerance bounds and aggregate tolerance bounds for the aggregate constraints by determining whether there are possible values for the decision variables $Z_i$, which are within the decision variable tolerance bounds and that satisfy the aggregate constraints with the aggregate tolerance bounds, that will result in total possible sales being equal to (or greater than) the sales goal G. If values for the decision variables $Z_i$ exist that will result in the total possible sales being equal to (or greater than) the sales goal G, then server device 220 may determine the sales goal G is achievable. On the other hand, if values for the decision variables $Z_i$ do not exist that will result in the total possible sales being equal to (or greater than) the sales goal G, then server device 220 may determine the sales goal G is not achievable.

For example, server device 220 may determine whether the sales goal G is achievable based on whether formula 7 can be satisfied:

$$f(Z_1, \ldots, Z_n) = G;$$

$$t\_lb_i \le Z_i \le t\_ub_i \text{ for all } i;$$

$$t\_lba_k \le g_k(Z) \le t\_uba_k \text{ for all } k. \quad \text{Formula 7:}$$

Accordingly, if formula 7 can be satisfied, server device 220 may determine the sales goal G is achievable within the decision variable tolerance bounds and the aggregate tolerance bounds. On the other hand, if formula 7 cannot be satisfied, server device 220 may determine the sales goal G is not achievable.

As further shown in FIG. 4B, if the sales goal G is determined to be achievable within the decision variable tolerance bounds and the aggregate tolerance bounds for the aggregate constraints (block 420—yes), process 400 may include determining optimized decision variables $Z_i$ that achieve the sales goal and minimize a penalty value calculated based on exceeding the decision variable bounds and the aggregate bounds (block 422). For example, server device 220 may determine the optimized decision variables $Z_i$.

The optimized decision variables $Z_i$ may be determined based on a balance of minimizing the total investment cost and minimizing an amount the decision variable bounds and the aggregate bounds that are exceeded (while still being constrained by the decision variable tolerance bounds and the aggregate tolerance bounds).

In some implementations, server device 220 may determine a penalty value P based on the total investment cost, an amount a particular decision variable exceeds a decision variable bound, and an amount a particular aggregate constraint exceeds an aggregate bound. Server device 220 may determine the optimized decision variables for each marketing driver by finding values for the decision variables that minimize the penalty value P while satisfying the decision variable tolerance bounds, the aggregate tolerance bounds for the aggregate constraints, and achieving the sales goal G.

For example, server device 220 may determine optimized decision variables $Z_1$ to $Z_n$ by determining decision variables $Z_1$ to $Z_n$ that satisfy formula 8:

Minimize P, where $$P = \sum_{i=1}^{n} \max[(Z_i - lb_i)(Z_i - ub_i), 0] + \sum_{k=1}^{A} \max[(g_k(Z) - lba_k)(g_k(Z) - uba_k), 0] + r(n+A)\left(\frac{\sum_{i=1}^{n}(Z_i M_i)}{\sum_{i=1}^{n}(M_j)}\right)^2;$$

subject to $$f(Z_1, \ldots, Z_n) = G;$$

$$t\_lb_i \le Z_i \le t\_ub_i \text{ for all } i;$$

$$t\_lba_k \le g_k(Z) \le t\_uba_k \text{ for all } k. \quad \text{Formula 8:}$$

In some implementations, server device 220 may use a high level solver, such as a non-linear solver, to determine decision variables $Z_1$ to $Z_n$ that satisfy formula 8.

A first part of the penalty value P (e.g., $$\sum_{i=1}^{n} \max[(Z_i - lb_i)(Z_i - ub_i), 0]$$

) represents a first term (e.g., a first score) for breaching the variable tolerance bounds for decision variables $Z_i$. The constraint for the decision variable $Z_i$ (e.g., $t\_lb_i \le Z_i \le t\_ub_i$) is given in terms of decision variable tolerance bounds (e.g., $t\_lb_i$ and $t\_ub_i$), but the first term is defined in terms of decision variable bounds (e.g., $lb_i$ and $ub_i$). The first term may be 0 if a particular decision variable $Z_i$ is within the decision variable bounds, but may grow quadratically as the particular decision variable $Z_i$ moves further away from the decision variable bounds.

A second part of the penalty value P (e.g., $$\sum_{k=1}^{A} \max[(g_k(Z) - lba_k)(g_k(Z) - uba_k), 0]$$

) represents a second term (e.g., a second score) for aggregate constraints breaching the aggregate bounds. The constraint for the linear combination of decision variables $g_k(Z)$ (e.g., $t\_lba_k \le g_k(Z) \le t\_uba_k$) is given in terms of aggregate tolerance bounds (e.g., $t\_lba_k$ and $t\_uba_k$), but the second term is defined in terms of decision variable bounds (e.g., $lba_k$ and $uba_k$). The second term may be 0 if a particular linear combination of decision variables $g_k(Z)$ is within the aggregate bounds, but may grow quadratically as the particular linear combination of decision variables moves further away from the aggregate bounds.

A third part of the penalty value P (e.g., $$r(n+A)\left(\frac{\left(\sum_{i=1}^{n}(Z_iM_i)\right)^2}{\sum_{i=1}^{n}(M_i)}\right)$$

) represents a third term (e.g., a third score) based on total investment cost. Here, $$\sum_{i=1}^{n}(Z_iM_i)$$

represents the total investment cost, and dividing the total investment cost by the total historical investment (e.g., $$\sum_{i=1}^{n}(M_i)$$

) normalizes the overall investment cost to be consistent with the first and second penalties of the penalty value P. The normalized investment cost may be multiplied by the total of the terms in the first and second penalties (e.g., n [number of decision variables]+A [number of aggregate constraints]) to put the third term on a same scale as the first and second penalties.

Moreover, a multiplier r may be applied to the third term to increase or decrease the weight of minimizing total investment cost (e.g., the weight of the third term) in relation to minimizing deviations from the decision variable bounds and the aggregate bounds (e.g., the weight of the first and second penalties). The value of r may be input by the user of user device 210. In this way, the user may set the balance between minimizing the total investment cost and minimizing an amount the decision variable bounds and the aggregate bounds are exceeded. Alternatively, the value of r may be set to a default value by server device 220.

Although formula 8 shows a multiplier r being applied to the third term to change the weights, multipliers may also be applied to the first term and/or the second term so that each term may be weighted individually. Furthermore, other mathematically equivalent formulas as formula 8 may be used.

As further shown in FIG. 4B, process 400 may include providing optimized investment information based on the optimized decision variables $Z_i$ (block 424). For example, server device 220 may provide the optimized investment information to user device 210. User device 210 may receive the optimized investment information and present the optimized investment information to the user.

In some implementations, the optimized investment information may indicate the optimized decision variables $Z_i$ for each marketing driver. For example, the optimized investment information may indicate a value for each decision variable $Z_i$ associated with a marketing driver that optimizes investments to achieve the sales goal. In this way, the user may be made aware of a percentage difference and/or a ratio between an optimized investment $X_i$ and a historical investment $M_i$ for each marketing driver.

In some implementations, server device 220 may determine the optimized investment $X_i$ for each marketing driver based on the optimized decision variable $Z_i$ and formula 1 (i.e., $X_i=Z_iM_i$). Accordingly, the optimized investment information may indicate the optimized investment $X_i$ for each marketing driver. In this way, the user may made aware of an amount of money to invest in each marketing driver (e.g., an amount to spend on particular types of advertising) to achieve the sales goal G while maintaining a balance between minimizing total investment cost and minimizing a deviation from the initial constraints. Additionally, or alternatively, the optimized investment information may indicate the total investment cost to achieve the sales goal G.

As further shown in FIG. 4B, if the sales goal is determined not to be achievable within the decision variable tolerance bounds and the aggregate tolerance bounds for the aggregate constraints (block 420—no), process 400 may include determining optimized decision variables $Z_i$ that maximize sales (block 426). For example, server device 220 may determine optimized decision variables $Z_i$ that maximize sales.

In some implementations, server device 220 may determine optimized decision variables $Z_i$ that maximize sales while satisfying the decision variable tolerance bounds and the aggregate constraints with the aggregate tolerance bounds. In other words, server device 220 may determine optimized decision variables $Z_i$ that maximize sales using formula 9 below.

Maximize $f(Z_1, \ldots, Z_n)$; subject to $t\_lb_i \leq Z_i \leq t\_ub_i$ for all $i$;

$t\_lba_k \leq g_k(Z) \leq t\_uba_k$ for all $k$.     Formula 9:

Additionally, or alternatively, server device 220 may determine optimized decision variables $Z_i$ that maximize sales while satisfying the decision variable bounds and the aggregate constraints with the aggregate bounds. In other words, server device 220 may determine optimized decision variables $Z_i$ that maximize sales using formula 10 below.

Maximize $f(Z_1, \ldots, Z_n)$; subject to $lb_i \leq Z_i \leq ub_i$ for all $i$;

$lba_k \leq g_k(Z) \leq uba_k$ for all $k$.     Formula 10:

In this way, even though a sales goal G set by the user may not be achievable, a maximum amount of sales, given particular constraints, and optimized decision variables $Z_i$ that lead to the maximum amount of sales may still be determined.

As further shown in FIG. 4B, process 400 may include providing optimized monetary investment information indicating the decision variable values and/or the maximized sales (block 428). For example, server device 220 may provide the optimized monetary investment information.

In some implementations, the optimized investment information may indicate the optimized decision variables $Z_i$ for each marketing driver that lead to the maximum amount of sales. For example, the optimized investment information may indicate a value for each decision variable $Z_i$ associated with a marketing driver that optimizes investments to achieve the maximized amount of sales. In this way, the user may be made aware of a percentage difference and/or a ratio between an optimized investment $X_i$ and a historical investment $M_i$ for each marketing driver.

In some implementations, server device 220 may determine the optimized investment $X_i$ for each marketing driver based on the optimized decision variable $Z_i$ and formula 1

(i.e., $X_i=Z_iM_i$). Accordingly, the optimized investment information may indicate the optimized investment $X_i$ for each marketing driver. In this way, the user may be made aware of an amount of money to invest in each marketing driver (e.g., an amount to spend on particular types of advertising) to maximize sales. Additionally, or alternatively, the optimized investment information may indicate the total investment cost to achieve the maximum sales.

In some implementations, server device 220 may automatically determine marketing providers (e.g., advertisement agencies, TV stations, radio stations, newspapers, sales agencies, etc.) that may provide the types of marketing indicated by the optimized investments. For example, server device 220 may determine a marketing provider for a particular marketing driver based on the region serviced by the marketing driver and the marketing provider, and/or based on the optimized investment for the marketing driver. The optimized investment information may indicate one or more recommendations for marketing providers for each marketing driver.

In some implementations, server device 220 may solicit bids from marketing providers based on the optimized investments for each marketing driver. For example, server device 220 may identify marketing providers that service the type of marketing drivers indicated by the optimized investment information. Server device 220 may provide the marketing providers with a request for a bid. The request may include information on the user of user device 210, information identifying the product to be sold, information identifying a marketing driver used to sell the product by the user, and/or information identifying the optimized investment for the marketing driver. Server device 220 may receive bids from the marketing providers based on the request. The bids may include details on what specific marketing (e.g., specific advertisements, specific places to run advertisements, etc.) may be provided based on the optimized investment for a particular marketing driver. Server device 220 may include the bids in the optimized investment information provided to user device 210.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
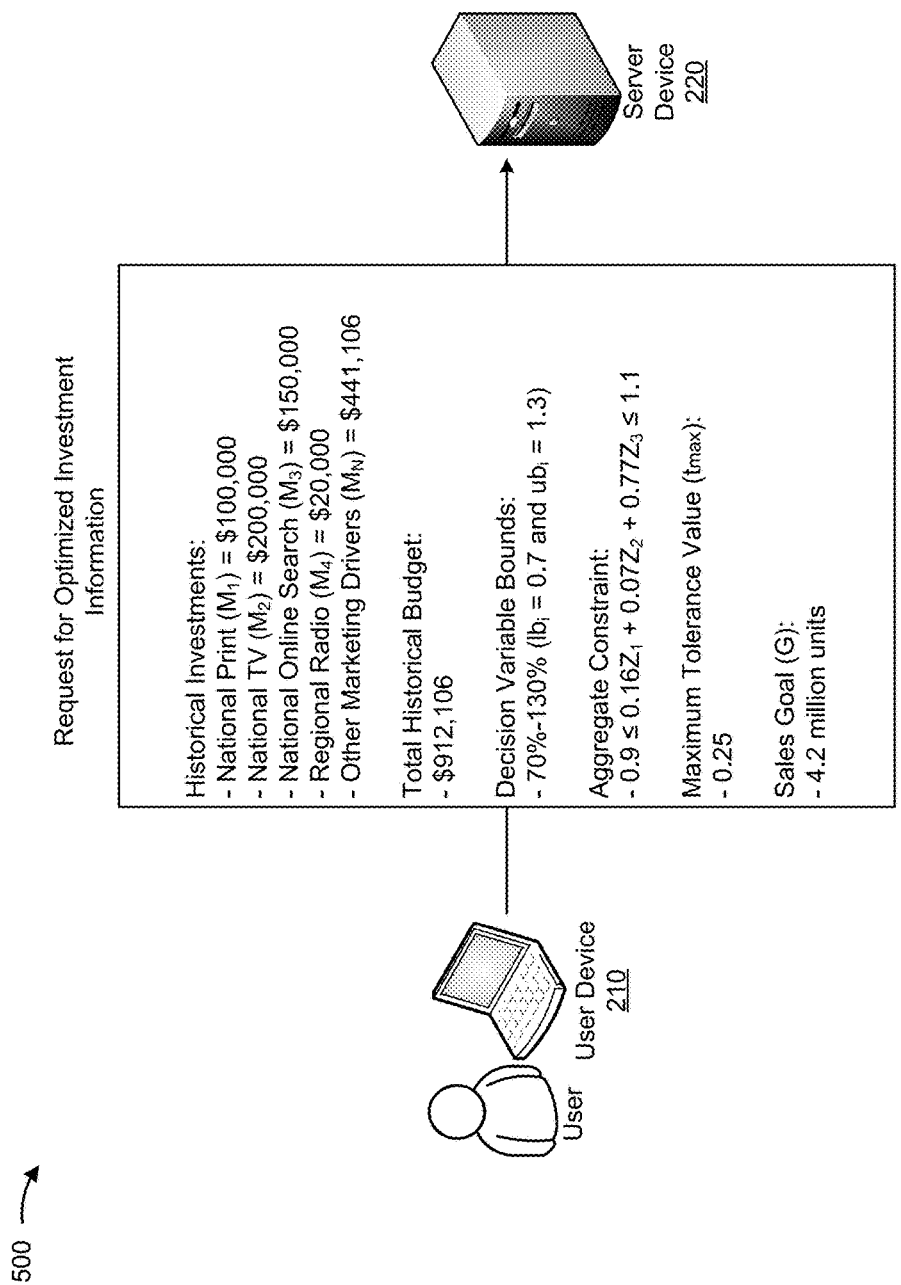
FIGS. 5A-5C are diagrams of an example implementation relating to the example process shown in FIGS. 4A and 4B.
Figure 5B:
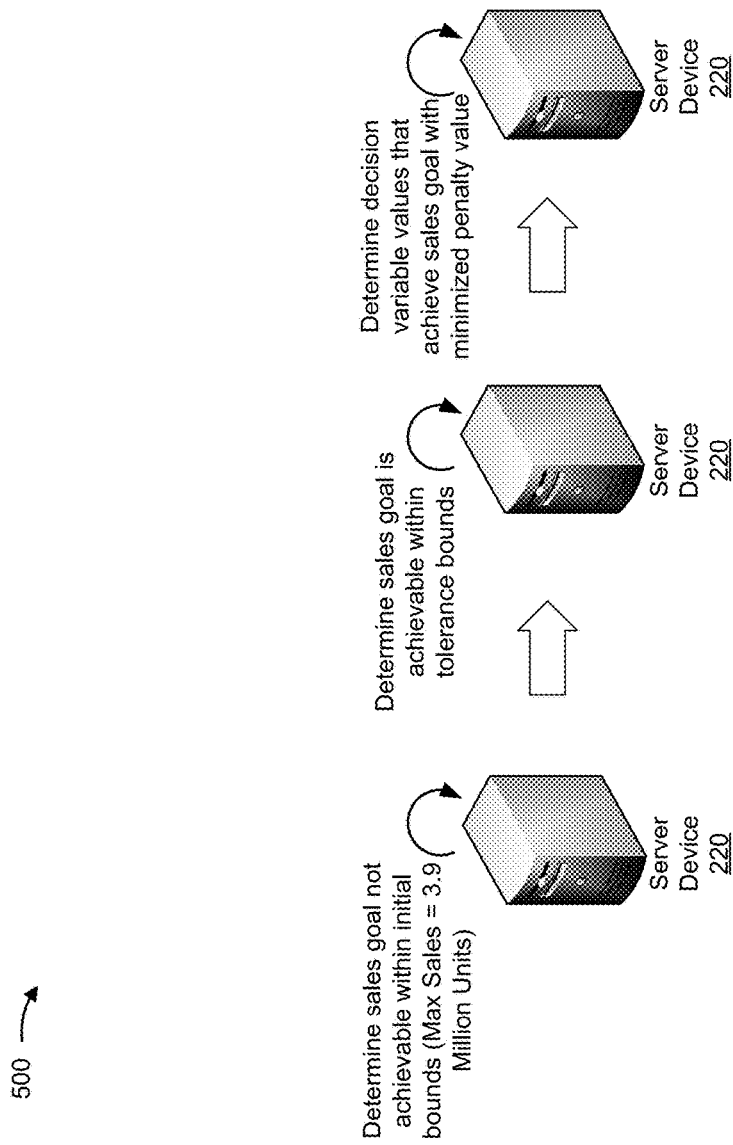
Figure 5C:
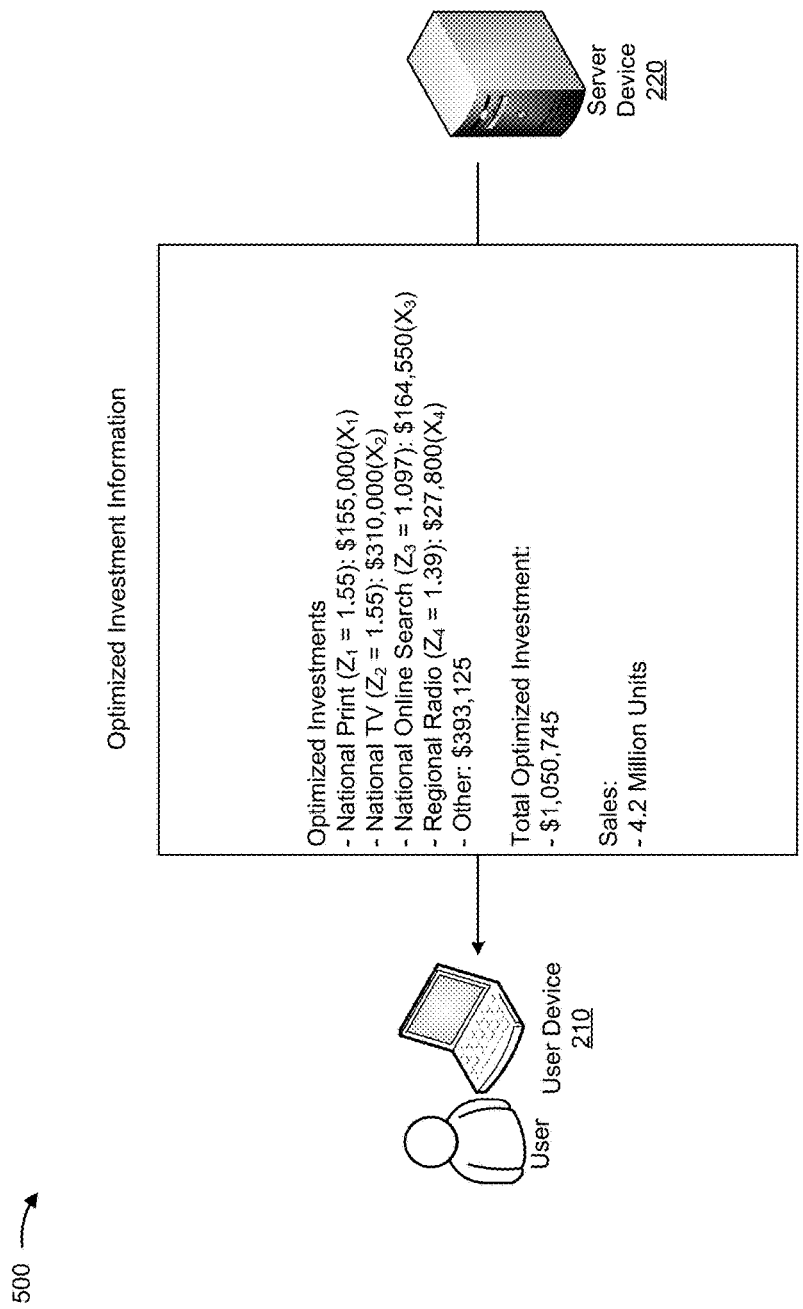

FIGS. 5A-5C are diagrams of an example implementation 500 relating to example process 400 shown in FIGS. 4A and 4B. FIGS. 5A-5C show an example of determining optimized investment information.

As shown in FIG. 5A, assume user device 210 sends a request for optimized investment information to server device 220. Further, assume the request includes historical investment information indicating that a historical investment $M_1$ of $100,000 is spent on national print advertising (e.g., a marketing driver) for a product, a historical investment $M_2$ of $200,000 is spent on national TV advertising for the product, a historical investment $M_3$ of $150,000 is spent on national online search advertising for the product, a historical investment $M_4$ of $20,000 is spent on regional radio advertising for the product, and a historical investment $M_5+M_6+\ldots+M_{500}$ of $441,106 is spent among various other marketing drivers for the product, with the total number of marketing drivers, N, in this example being N=500. Accordingly, a total historical investment for marketing the product may be $912,106.

Also, assume the request indicates a range for decision variables of 70% to 130%. In other words, assume a lower decision variable bound $lb_i$ is set to 0.7 and an upper decision variable bound $ub_i$ is set to 1.3. In other words, the user may set a constraint for the optimized investments that each optimized investment $X_i$ for a marketing driver must be within the range of 70% to 130% of the historical investment $M_i$.

Further, assume the request indicates an aggregate constraint for the optimized investments. For example, the user may input an aggregate constraint of $0.9 \le 0.16\ Z_1+0.07\ Z_2+0.77\ Z_3 \le 1.1$, where the lower aggregate bound $lba_k$ is 0.9 and the upper aggregate bound $uba_k$ is 1.1. In other words, the user may set aggregate bounds and weights for a combination of a decision variable $Z_1$ for national print advertisements, a decision variable $Z_2$ for national TV advertisements, and a decision variable $Z_3$ for national online search advertisements.

Moreover, assume the request indicates a maximum tolerance value $t_{max}$ of 0.25 and a sales goal of 4.2 million units of product sold.

As further shown in FIG. 5A, server device 220 may receive the request sent by user device 210.

As shown in FIG. 5B, server device 220 may determine whether the sales goal is achievable within the decision variable bounds and the aggregate constraint bounds set by the user. Assume that server device 220 determines that when the decision variables for each marketing driver and the aggregate constraints are all maxed out while still satisfying the decision variable bounds and the aggregate constraint bounds, a maximum possible sales is 3.9 million units. Thus, server device 220 may determine that the sales goal of 4.2 million units is not achievable given the constraints set by the user.

As further shown in FIG. 5B, server device 220 may determine whether the sales goal is achievable within tolerance bounds for the decision variables and aggregate constraints. Assume server device 220 calculates a lower decision variable tolerance bound $t\_lb_i$ to be 0.55 ($t\_lb_i=lb_i-t_{max}=0.7-0.25=0.55$). Further, assume server device 220 calculates an upper decision variable tolerance bound $t\_ub_i$ to be 1.55 ($t\_ub_i=ub_i+t_{max}=1.3+0.25=1.55$). Likewise, assume server device 220 calculates a lower aggregate tolerance bound $t\_lba_k$ to be 0.65 ($t\_lba_k=lba_k-t_{max}=0.9-0.25=0.65$). Similarly, assume server device 220 calculates an upper aggregate tolerance bound $t\_uba_k$ to be 1.35 ($t\_uba_k=uba_k+t_{max}=1.1+0.25=1.35$). Accordingly, decision variables $Z_i$ may have broader values with the tolerance bounds than the initially set bounds (e.g., the decision variable bounds and the aggregate bounds set by the user). Assume server device 220 determines the sales goal of 4.2 million units is achievable within these tolerance bounds, but not within the original bounds.

As further shown in FIG. 5B, server device 220 may determine optimized values for the decision variables $Z_i$ that achieve the sales goal while minimizing the penalty value P based on formula 8:

Minimize P, where $$P = \max[(Z_1 - 0.7)(Z_1 - 1.3)] + \max[(Z_2 - 0.7)(Z_2 - 1.3)] + \ldots +$$
$$\max[(Z_{500} - 0.7)(Z_{500} - 1.3)] + \max[(0.16Z_1 + 0.07Z_2 + 0.77Z_3 - 0.9)$$
$$(0.16Z_1 + 0.07Z_2 + 0.77Z_3 - 1.1)] +$$
$$0.5(501)\left(\frac{100{,}000Z1 + 200{,}000Z2 + 150{,}000Z3 + 20{,}000Z4 + \ldots}{912{,}106}\right)^2$$
$$\text{(similiar terms for Z5 through Z500)}$$

subject to:

$$0.55 \leq Z_1 \leq 1.55, 0.55 \leq Z_2 \leq 1.55, \ldots, 0.55 \leq Z_{500} \leq 1.55;$$

$$0.65 \leq 0.16 Z_1 + 0.07 Z_2 + 0.77 Z_3 \leq 1.35;$$

$$f(Z_1, \ldots, Z_{500}) = 4,200,000.$$

The chosen value of multiplier r in this example is r=0.5. Based on such optimization formulation, server device 220 may determine $Z_1=1.55$, $Z_2=1.55$, $Z_3=1.097$, $Z_4=1.39$, etc.

As shown in FIG. 5C, server device 220 may send optimized investment information to user device 210 based on the request.

The optimized investment information may indicate the optimized decision variables $Z_i$ and the optimized investments $X_i$ for each marketing driver. For example, server device 220 may calculate the optimized investments Xi based on formula 1 above. For instance, server device 220 may determine an optimized investment $X_1$ for national print advertising is \$155,000 ($X_1=Z_1M_1=1.55*\$100,000=\$155,000$). Server device 220 may determine an optimized investment $X_2$ for national TV advertising is \$325,000 ($X_2=Z_2M_2=1.55*\$200,000=\$310,000$). Server device 220 may determine an optimized investment $X_3$ for national online search advertising is \$164,550 ($X_3=Z_3M_3=1.097*\$150,000=\$164,550$). Server device 220 may determine an optimized investment $X_4$ for regional radio advertising is \$27,800 ($X_4=Z_4M_4=1.39*\$20,000=\$27,800$). Assume server device 220 calculates an optimized investment for the other marketing drivers to be a total of \$393,125. Thus, the total optimized investment may be equal to \$1,050,475 to achieve the sales goal of 4.2 million units of the product.

As indicated above, FIGS. 5A-5C are provided merely as an example. Other examples are possible and may differ from what was described with regard to FIGS. 5A-5C.

Rather than simply informing the user that a sales goal is not achievable given initial constraints, implementations described herein may relax the constraints to determine if the sales goal is achievable within relaxed constraints. If the sales goal is achievable, implementations described herein may determine an optimal mix of investments that will meet the sales goal, while striking a balance between minimizing the total cost of investments and minimizing a deviation from the constraints.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive a request to provide optimized investment information,
         the optimized investment information indicating optimized investments for a plurality of types of marketing;
      receive constraint information indicating bounds for the optimized investments;
      receive sales goal information indicating a sales goal to be achieved by the optimized investments;
      determine the sales goal is not achievable based on the bounds;
      broaden the bounds for the optimized investments based on the sales goal not being achievable such that the optimized investments may deviate from the bounds;
      calculate a penalty value that balances a deviation of the optimized investments from the bounds and a total monetary cost of the optimized investments,
         the bounds indicating a permitted ratio of an optimized investment to a historical investment for a particular type of marketing of the plurality of types of marketing,
      determine the optimized investments to achieve the sales goal based on minimizing the penalty value;
      provide the optimized investment information, indicating the optimized investments, to another device based on the request;
      automatically determine marketing providers that provide the optimized investments;
      solicit bids from the marketing providers based on the optimized investments; and
      receive the bids from the marketing providers,
         the optimized investment information indicating the bids.

2. The device of claim 1, where the one or more processors are further to:
   receive historical investment information indicating historical investments for the plurality of types of marketing.

3. The device of claim 1, where the one or more processors are further to:
   receive aggregate constraint information indicating an aggregate constraint for the optimized investments, the aggregate constraint representing a constraint on a combined investment for more than one of the plurality of types of marketing,
where the one or more processors, when determining the sales goal is not achievable, are further to:
determine the sales goal is not achievable based on the bounds and the aggregate constraint.

4. The device of claim 1, where the one or more processors are further to:
receive aggregate constraint information indicating an aggregate constraint for the optimized investments,
the aggregate constraint indicating aggregate bounds for a combined investment for more than one of the plurality of types of marketing;
broaden the aggregate bounds for the combined investment based on the sales goal not being achievable such that the combined investment may deviate from the aggregate bounds; and
where the one or more processors, when determining the optimized investments, are further to:
determine the optimized investments based on the deviation of the optimized investments from the bounds, a deviation of the combined investment from the aggregate bounds, and the total monetary cost of the optimized investments.

5. The device of claim 1, where the penalty value is based on a first score representing the deviation of the optimized investments from the bounds and a second score based on the total monetary cost of the optimized investments,
the first score and the second score being associated with weights used to calculate the penalty value.

6. The device of claim 1, where the penalty value is based on a first score representing the deviation of the optimized investments from the bounds and a second score based on the total monetary cost of the optimized investments,
the first score and the second score being associated with weights used to calculate the penalty value,
the weights being based on user input.

7. A non-transitory computer-readable medium storing instructions, the instructions comprising:
one or more instructions that, when executed by one or more processors, cause the one or more processors to:
receive a request to provide optimized investment information,
the optimized investment information indicating optimized investments for a plurality of types of marketing;
receive constraint information indicating bounds for the optimized investments;
receive sales goal information indicating a sales goal to be achieved by the optimized investments;
determine the sales goal is not achievable based on the bounds;
broaden the bounds for the optimized investments based on the sales goal not being achievable such that the optimized investments may deviate from the bounds;
calculate a penalty value that balances a deviation of the optimized investments from the bounds and a total monetary cost of the optimized investments,
the bounds indicating a permitted ratio of an optimized investment to a historical investment for a particular type of marketing of the plurality of types of marketing,
determine the optimized investments to achieve the sales goal based on minimizing the penalty value;
provide the optimized investment information, indicating the optimized investments, to another device based on the request;
automatically determine marketing providers that provide the optimized investments;
solicit bids from the marketing providers based on the optimized investments; and
receive the bids from the marketing providers,
the optimized investment information indicating the bids.

8. The non-transitory computer-readable medium of claim 7, where the one or more instructions, when executed by the one or more processors, further cause the one or more processors to:
receive historical investment information indicating historical investments for the plurality of types of marketing.

9. The non-transitory computer-readable medium of claim 7, where the one or more instructions, when executed by the one or more processors, further cause the one or more processors to:
receive aggregate constraint information indicating an aggregate constraint for the optimized investments,
the aggregate constraint representing a constraint on a combined investment for more than one of the plurality of types of marketing,
where the one or more instructions, that cause the one or more processors to determine the sales goal is not achievable, cause the one or more processors to:
determine the sales goal is not achievable based on the bounds and the aggregate constraint.

10. The non-transitory computer-readable medium of claim 7, where the one or more instructions, when executed by the one or more processors, further cause the one or more processors to:
receive aggregate constraint information indicating an aggregate constraint for the optimized investments,
the aggregate constraint indicating aggregate bounds for a combined investment for more than one of the plurality of types of marketing;
broaden the aggregate bounds for the combined investment based on the sales goal not being achievable such that the combined investment may deviate from the aggregate bounds; and
where the one or more instructions, that cause the one or more processors to determine the optimized investments, cause the one or more processors to:
determine the optimized investments based on the deviation of the optimized investments from the bounds, a deviation of the combined investment from the aggregate bounds, and the total monetary cost of the optimized investments.

11. A method, comprising:
receiving, by a device, a request to provide optimized investment information,
the optimized investment information indicating optimized investments for a plurality of types of marketing;
receiving, by the device, constraint information indicating bounds for the optimized investments;
receiving, by the device, sales goal information indicating a sales goal to be achieved by the optimized investments;
determining, by the device, the sales goal is not achievable based on the bounds;

broadening, by the device, the bounds for the optimized investments based on the sales goal not being achievable such that the optimized investments may deviate from the bounds;

calculating, by the device, a penalty value that balances a deviation of the optimized investments from the bounds and a total monetary cost of the optimized investments, the bounds indicating a permitted ratio of an optimized investment to a historical investment for a particular type of marketing of the plurality of types of marketing, determining, by the device, the optimized investments to achieve the sales goal based on minimizing the penalty value;

providing, by the device, the optimized investment information, indicating the optimized investments, to another device based on the request;

automatically determining, by the device, marketing providers that provide the optimized investments;

soliciting, by the device, bids from the marketing providers based on the optimized investments; and receiving, by the device, the bids from the marketing providers, the optimized investment information indicating the bids.

12. The method of claim 11, further comprising:
receiving historical investment information indicating historical investments for the plurality of types of marketing.

13. The method of claim 11, further comprising:
receiving aggregate constraint information indicating an aggregate constraint for the optimized investments,
the aggregate constraint representing a constraint on a combined investment for more than one of the plurality of types of marketing,
where determining the sales goal is not achievable includes:
determining the sales goal is not achievable based on the bounds and the aggregate constraint.

14. The method of claim 11, further comprising:
receiving aggregate constraint information indicating an aggregate constraint for the optimized investments,
the aggregate constraint indicating aggregate bounds for a combined investment for more than one of the plurality of types of marketing;
broadening the aggregate bounds for the combined investment based on the sales goal not being achievable such that the combined investment may deviate from the aggregate bounds; and
where determining the optimized investments includes:
determining the optimized investments based on the deviation of the optimized investments from the bounds, a deviation of the combined investment from the aggregate bounds, and the total monetary cost of the optimized investments.

15. The method of claim 11, where the bids include information indicating an advertisement and a location to run the advertisement.

16. The method of claim 11, where determining the optimized investments includes:
determining the optimized investments using a non-linear solver of the device.

17. The device of claim 1, where the bids include information indicating an advertisement and a location to run the advertisement.

18. The device of claim 1, where the optimized investments are determined using a non-linear solver of the device.

19. The non-transitory computer-readable medium of claim 7, where the bids include information indicating an advertisement and a location to run the advertisement.

20. The non-transitory computer-readable medium of claim 7, where the optimized investments are determined by causing the one or more processors to use a non-linear solver.

* * * * *